United States Patent Office 3,471,588
Patented Oct. 7, 1969

3,471,588
SILICONE ETHER-OLEFIN GRAFT COPOLYMERS
AND PROCESS FOR THEIR PRODUCTION
Bernard Kanner, Williamsville, and Marshall L. Wheeler,
Jr., Tonawanda, N.Y., assignors to Union Carbide Corporation, a corporation of New York
No Drawing. Filed Dec. 29, 1964, Ser. No. 422,015
Int. Cl. C08g 47/10, 31/16, 31/18
U.S. Cl. 260—827                                13 Claims

ABSTRACT OF THE DISCLOSURE

This invention relates to graft copolymers produced by grafting an olefin to a silicone ether. Suitable olefins include organic olefins (e.g., styrene), alkenylsilanes and alkenylsiloxanes and suitable silicone ethers include siloxane-polyoxyalkylene copolymers. The invention also relates to blends composed of the novel graft copolymers dispersed in a major amount of a thermoplastic organic polymer. The graft copolymers improve the properties of the organic polymers (e.g., the release, leveling, slip and adhesion properties). The novel graft copolymers are also useful as foam stabilizers for polyurethane foams.

---

This invention relates to novel organosilicon graft copolymers and to a process for the production thereof. More specifically, this invention relates to silicon-containing graft copolymers produced by grafting an olefinic compound to a silicone ether.

Prior to the instant invention, silicon-organic graft copolymers containing significant amounts of the silicone were practically unknown. By way of illustration, while the direct grafting of organic olefins to dimethylsiloxanes has been disclosed in literature, such processes are unsatisfactory. The desired graft copolymer, as for example in the grafting of styrene to dimethylsiloxanes, is obtained in small yields and is contaminated by gross amounts of organic homopolymer, in this case, polystyrene. This is generally true because the methyl groups in dimethylsiloxanes are resistant to attack by peroxides and, in order for the process to be successful, abstraction of a hydrogen radical from the polymer is an essential step. The desired reaction sequence is shown below:

(1) 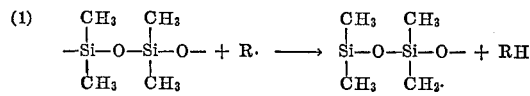

(2) 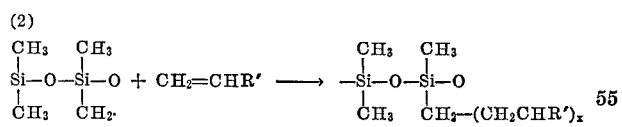

Since reaction (1) is comparatively poor, very little graft copolymer is formed in step (2) and, instead, the free radicals generated attack the organic olefins resulting principally in homopolymer formation.

In accordance with this invention, it has been found that by suitably modifying silicones with certain groups, it is now possible to prepare a wide range of silicone-organic graft polymers which are substantially true graft polymers free of large amounts of contaminating homopolymers. More specifically, it has been found that modifying silicones with ether groups makes the resulting compound far more susceptible to attack by free radicals and allows the formation of a graft copolymer in good yields. Without wishing to be bound by any particular theory, it is believed that the graft polymerization process of this invention proceeds as illustrated by the following equations:

(3) 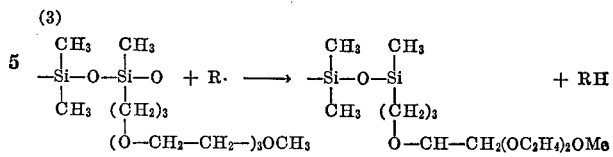

(4) 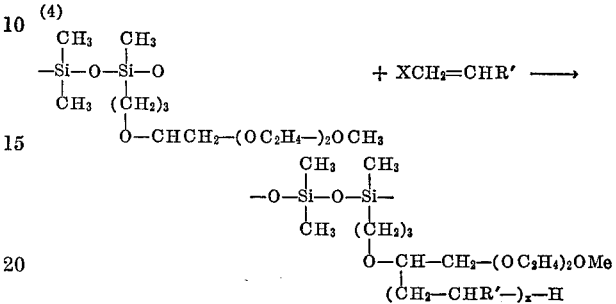

Thus a free radical generator, such as a peroxide, initiates the graft copolymerization process by abstraction of a hydrogen atom from the ether portion of the starting silicone-ether compound. The resulting activated silicone-ether compound reacts with an olefin by addition to the carbon-carbon double bond. This addition continues until the polymer stabilizes itself by abstraction of a hydrogen from additional ether site present (chain transfer). The resulting novel graft copolymer thus formed can be graphically illustrated as follows:

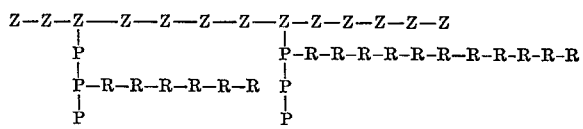

wherein Z represents a repeating unit of a siloxane backbone polymer, P represents a repeating ether (oxyalkylene) unit and R represents a repeating organic monomer unit formed by carbon-carbon addition.

The silicon-ether compound used in producing the copolymers of this invention include a wide variety of materials characterized by the presence of a silicone moiety and an ether moiety and further characterized by the absence of silicon-bonded hydrogen atoms and aliphatic unsaturation. As used herein, the term "silicone" is used in a generic sense to include both organosilicon monomers (silanes) and organosilicon polymers (siloxanes).

Suitable silicone-ether compounds of the silane variety include those silanes having the formula

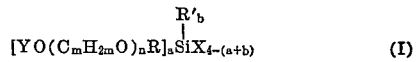

wherein Y is a hydroxyalkyl group (e.g. $HOCH_2CH_2-$, $HOC_4H_8-$, $HOC_8H_{16}-$, etc.), an acyloxyalkyl group (e.g. $CH_3COOCH_2CH_2-$, $CH_3CH_2COOCH_2CH_2CH_2-$, $CH_3COOC_4H_8-$, etc.), R' or $-RSi(R'_b)X_{4-(a+b)}$, R is a divalent organic group (as defined below), R' is a monovalent hydrocarbon group free of aliphatic unsaturation (e.g. an alkyl or an aryl group), X is a hydrolyzable group that is non-reactive under the conditions employed in producing the graft copolymer [e.g. $-OH$, $-OCH_3$, $OC_6H_5$, acyloxy (acetoxy or propionyl group) fluorine, $(CH_3)_3CO-$, etc.], $a$ has a value from 1 to 3 inclusive, $b$ has a value from 0 to 2 inclusive, $(a+b)$ has a value from 1 to 3 inclusive, $m$ has a value of at least 2 and $n$ has a value of at least 0 (preferably $n$ has a value of at least 2 and, more preferably, a value from 3 to 30). Typical of such silanes are $$HOCH_2CH_2CH_2OCH_2CH_2Si(OOCH_3)_3,$$

$$CH_3OCH_2CH_2CH_2OCH_2CH_2SiCH_3(OCH_3)_2,$$

$$[CH_3COO(CH_2CH_2O)_3CH_2CH_2CH_2]_2'\!\!-\!\!Si(OC_2H_5)_2,$$

etc.

Suitable silicon-ether compounds of the siloxane variety include siloxanes consisting essentially of groups having the formula $$[Y'O(C_mH_{2m}O)_nR]_a\overset{R'_b}{\underset{|}{Si}}O_{\tfrac{4-(a+b)}{2}} \qquad (II)$$

wherein Y' is a hydroxylalkyl group, an acyloxyalkyl group, R' or $$-R_aSi(R'_b)O_{\tfrac{4-(a+b)}{2}}$$

and R,R', $a$, $b$, $(a+b)$, $m$ and $n$ have the above-defined meanings.

Also included among the siloxanes that are useful in producing the graft copolymers of this invention are siloxanes consisting essentially of from 2 to 98 mole percent (preferably from 10 to 40 mole percent) of groups represented by Formula II above and from 2 to 98 mole percent (preferably from 60 to 90 mole percent) of groups having the formula $$R'_cSiO_{\tfrac{4-c}{2}} \qquad (III)$$

wherein R' has the meaning defined for Formula I and $c$ has a value from 1 to 3 inclusive.

It should be understood that the above-described silicon-ether compounds of the siloxane variety often contain additional groups not shown in Formula I or II. Thus, these siloxanes can contain silicon-bonded acyloxy groups (e.g. acetoxy groups), hydroxyl groups and/or alkoxy groups (e.g. methoxy groups). In addition, organofunctional groups, such as halogen atoms or alkoxy groups, can be present as substituents on the silicon-bonded hydrocarbon groups.

The above-described silicone-ether compounds are often prepared by reacting a silicone compound and an ether and the nature of the reactive groups involved in this reaction usually determines the particular structure of the divalent organic group represented by R in Formulae I and II. Such reactions are illustrated by the following equations:

(a) $\equiv SiOR^3 + HOC\equiv \longrightarrow \equiv SiOC\equiv + R^3OH$ (b) $\equiv SiO\overset{O}{\overset{\|}{C}}\!\!-\!\!R^3 + HOC\equiv \longrightarrow \equiv SiOC\equiv + HO\overset{O}{\overset{\|}{C}}\!\!-\!\!R^3$ (c) $\equiv SiH + HOC\equiv \longrightarrow \equiv SiOC\equiv + H_2$ (d) $\equiv SiX + HOC\equiv \longrightarrow \equiv SiOC\equiv + HX$ (e) $\equiv SiOH + HOC\equiv \longrightarrow \equiv SiOC\equiv + H_2O$ (f) $\equiv Si(CH_2)_nCOOH + HOC\equiv \longrightarrow \equiv Si(CH_2)_nCOOC\equiv + H_2O$ (g)
$\equiv Si(CH_2)_3OCH_2C\overset{O}{\overset{\diagup\!\!\diagdown}{H}\!\!-\!\!CH_2} + HOC\equiv \longrightarrow$
$\equiv Si(CH_2)_3OCH_2CH(OH)CH_2OC\equiv$ (h) $\equiv SiCH=CH_2 + HOC\equiv \longrightarrow SiCH_2CH_2C\equiv$
$\overset{|}{OH}$ (i) $\equiv SiH + CH_2=CHCH_2OC\equiv \longrightarrow \equiv Si(CH_2)_3OC\equiv$ (j) $\equiv SiRHal + MOC\equiv \longrightarrow \equiv SiROC\equiv + MHal$ In the above Equations (a) to (j), $R^3$ represents a monovalent alkyl or aryl group, X represents a halogen atom or amino group, such as $NH_2$, $NHR^2$ and $NR_2^2$ wherein $R^2$ is a monovalent hydrocarbon radical, Hal represents a halogen, i.e. bromine, chlorine, fluorine, or iodine, M is an alkali metal such as sodium or potassium, and R is a divalent hydrocarbon radical, preferably a saturated aliphatic radical such as ethylene, propylene, n-butylene, isoamylene, hexamethylene and the like. In the Equations (a) through (h) the Si-containing group on the far left represents the reactive portion of the siloxane while the HOC≡ group represents a hydroxyl reactive portion of the organic polyol. In Equations (i) and (j) the Si-containing group on the far left represents the reactive portion of the siloxane and the $CH_2=CHCH_2OC\equiv$ and MOC≡ groups represent polyols in which some of the hydroxy groups have been replaced by allyloxy and metaloxy groups respectively in order to provide groups reactive with ≡SiH and ≡SiR Hal respectively. Preferably, R in Formulae I and II is either a divalent hydrocarbon group or a —R''—O— group where —R''— is a divalent hydrocarbon group and the oxygen atom is attached to silicon. The latter groups are produced by reactions such as are illustrated by Equations (a) to (e) above.

Silicone-ether compounds that are preferred as starting materials in producing the graft copolymers of this invention are the siloxane-oxyalkylene block copolymers described below.

The following classes of compounds are among the siloxane-oxyalkylene block copolymerst useful as reactants in producing the graft copolymers of this invention.

(A) Copolymers that contain at least one unit that is represented by the formula:

$$G'''(OG'')_nOG'\overset{G_c}{\underset{|}{Si}}O_{\tfrac{3-c}{2}} \qquad (5)$$

(B) Copolymers that contain at least one unit that is represented by the formula:

$$O_{\tfrac{3-c}{2}}\overset{G_c}{\underset{|}{Si}}G'O(G''O)_nG'\overset{G_c}{\underset{|}{Si}}O_{\tfrac{3-c}{2}} \qquad (6)$$

(C) Copolymers that contain at least one unit that is represented by the formula:

$$[G'''(OG'')_nOG']_2\overset{G_c}{\underset{|}{Si}}O_{\tfrac{2-c}{2}} \qquad (7)$$

In the above Formulas 5, 6 and 7, G is a monovalent, hydrocarbon radical, G' is a divalent hydrocarbon radical, G'' is an alkylene radical containing at least two carbon atoms, G''' is a hydrogen atom or a monovalent hydrocarbon radical free of aliphatic unsaturation and $n$ has a value of at least two and $c$ has a value from 0 to 2 in Formulas 5 and 6 and a value from 0 to 1 in Formula 7. In Formulas 5, 6 and 7, G can represent the same or different radicals, $n$ preferably has a value from 4 to 30 inclusive and G'' can represent the same or different radicals, i.e., the group $(OG'')_n$ can represent, for example, the groups: $-(OC_2H_4)_p-$, $-(OC_2H_4)(OC_3H_6)_q-$, $-(OC_3H_6)_p(OC_8H_{16})_q-$, where $p$ and $q$ are integers having a value of at least one.

The monovalent hydrocarbon radicals represented by G in Formulas 5, 6 and 7 are free of aliphatic unsaturation. Illustrative of the monovalent hydrocarbon radicals represented by G are the linear aliphatic radicals (e.g., the methyl, ethyl and decyl radicals), the cycloaliphatic radicals (e.g., the cyclohexyl and the cyclopentyl radicals), the aryl radicals (e.g., the phenyl, tolyl, xylyl and naphthyl radicals) and the aralkyl radicals (e.g., the benzyl and beta-phenethyl radicals).

Preferably, the G and G' groups [included in the definition of R in Formula I above] contain from one to about twelve carbon atoms and the G'' groups [included in the definition of R' in Formula I above] contain from two to about ten carbon atoms. When the G''' group is a monovalent hydrocarbon radical free of aliphatic unsaturation, it preferably contains from one to about twelve carbon atoms.

Illustrative of the divalent hydrocarbon radicals represented by G' in Formulas 5, 6 and 7 are the alkylene radicals (e.g., the methylene, ethylene, 1,3-propylene, 1,4-butylene and 1,-12-dodecylene radicals), the arylene radicals (e.g., the phenylene radical) and the alkarylene radicals (e.g., the phenylethylene radicals). In Formulas 5, 6 and 7, G' is preferably an alkylene radical containing at least two carbon atoms. Illustrative of the alkylene radicals containing at least two carbon atoms represented by G'' in Formulas 5, 6 and 7 are the ethylene, 1,3-propylene, 1,6-hexylene, 2-ethylhexylene-1,6- and 1,-12-dodecylene radicals. Illustrative of the radicals represented by G''' in Formulas 5, 6 and 7 are the saturated linear or branched chain aliphatic hydrocarbon radicals (e.g., the methyl, ethyl, propyl, n-butyl, tert-butyl and decyl radicals), the saturated cycloaliphatic hydrocarbon radicals (e.g., the cyclopentyl and cyclohexyl radicals), the aryl hydrocarbon radicals (e.g., the phenyl, tolyl, naphthyl and xylyl radicals), and the aralkyl hydrocarbon radicals (e.g., the benzyl and beta-phenylethyl radicals).

An especially preferred class of siloxane-oxyalkylene copolymers that are useful in this invention are those which are composed of from 1 to 99 mol percent (or preferably from 10 to 90 mol percent) of groups represented by the Formulas 5, 6 or 7 and from 1 to 99 mol percent (preferably from 10 to 90 mol percent) of groups represented by the formula

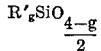

wherein R' is a monovalent hydrocarbon group as defined above for G and g has a value from 1 to 3 inclusive. The following are representative of the latter class of siloxane-oxyalkylene copolymers useful in the invention. In the formulas, "Me" represents the methyl group ($CH_3$—), and "Bu" represents the butyl group ($C_4H_9$—).

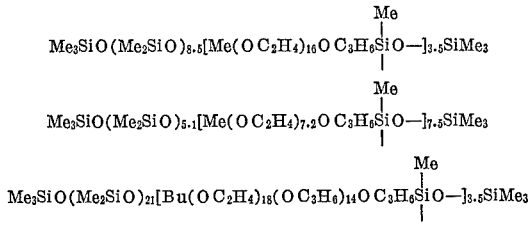

Among the siloxane-oxyalkylene copolymers that are especially suited for use in this invention are those having the formula:

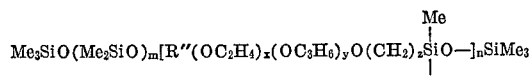

wherein $m$ has a value from 3 to 25 inclusive, $n$ has a value from 2 to 10 inclusive, $x$ has a value from 3 to 25 inclusive, $y$ has a value from 0 to 25 inclusive, $z$ has a value from 2 to 3 inclusive and R'' is an alkyl group containing from 1 to 4 carbon atoms inclusive.

Another class of siloxane-oxylakylene copolymers that tre useful in this invention are those represented by the formula:

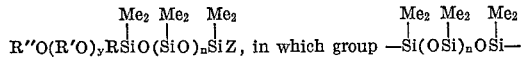

constitutes between 5 to 60% of the total weight of the copolymer, the groups $(R'O)_y$ together constituting at least 25% by weight of the copolymer and in which the combined weights of

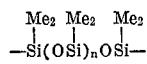

and —$(R'O)_y$— are not less than 50% of the total weight of the copolymer. In this formula, R'' is a hydrogen atom of a hydrocarbyl, hydrocarbonoxy, acyl, trihydrocarbylsilyl or monovalent hydrocarbon carbamyl radical; R' is an alkylene radical having from 2 to 4 carbon atoms; $y$ is a whole number from 4 to 2,000; R is a divalent non-aromatic hydrocarbon radical, divalent non-aromatic hydroxy-substituted hydrocarbon radical, divalent non-aromatic acyl radical derived from a monocarboxylic acid or a divalent non-aromatic hydroxy ether radical; R is connected to the silicon via a silicon-carbon bond; $n$ is equal to 0 or a positive whole number; and Z is a hydrocarbyl radical, a hydrocarbonoxy radical (i.e., $R(OR')_yOR''$ in which R, R', $y$ and R'' are as defined above) or of a radical of the formula —$ASiB_3$ this class of copolymers are those having the formulae: in which A is a divalent hydrocarbon radical and B is a hydrocarbyl or a trihydrocarbylsiloxy radical. Typical of

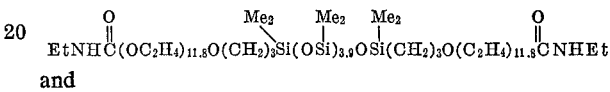

and

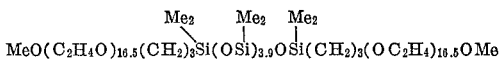

A further class of siloxane-oxylakylene copolymers that are useful in this invention are those contained in the group represented by the formula:

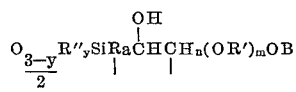

in which R'' is a hydrogen atom or a monovalent hydrocarbonoxy radical, monovalent hydrocarbon radical, monovalent halohydrocarbon radical or a monovalent halohydrocarboxony radical; $y$ has a value from 0 to 3; R is a divalent radical attached to the silicon through a silicon-carbon bond (e.g. a divalent hydrocarbon radical, divalent halohydrocarbon radical or a divalent radical composed of carbon, hydrogen and oxygen in the form of ether linkages); $n$ has a value from 1 to 2; $n$ being 1 when the C of the $CH_n$ group is linked directly to R in a cycloaliphatic ring; R' is an alkylene group of to 4 inclusive carbon atoms; $m$ is an integer of at least 1; and B is a hydrogen atom or a monovalent hydrocarbon radical, a monovalent hydrocarbonoxy radical or a monovalent halohydrocarbon radical. Typical of this class of copolymers are those having the formulae:

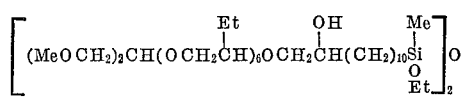

and

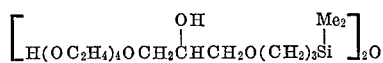

Another class of siloxane-oxyalkylene copolymers useful in this invention are those wherein the siloxane moiety is linked to an oxyalkylene moiety by a divalent group composed of a divalent hydrocarbon group linked to a carbonyl group. Such copolymers are illustrated by those containing a unit having the formula:

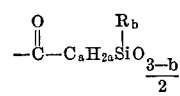

where R is a monovalent hydrocarbon radical or a halogenated monovalent hydrocarbon radical, $a$ is an integer of from 2 to 10 and $b$ is an integer of from 0 to 2. The unsatisfied valence of the acyl carbon atom (—CO—)

is attached through an oxygen linkage to a polyoxyalkylene chain. Typical copolymers of this class are those having the formulae:

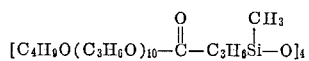

and

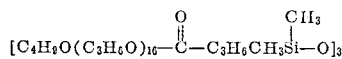

Yet another class of siloxane-oxyalkylene copolymers that are useful in this invention are those wherein the siloxane moiety is linked to the oxyalkylene moiety by a group composed of a divalent hydrocarbon group attached to an oxygen atom (e.g. the —CH$_2$CH$_2$—O— group). In such groups the oxygen atom is attached to a silicon atom of the siloxane moiety. Since the carbon-to-oxygen-to-silicon bonds provided by such divalent organic groups are hydrolyzable, this variety of copolymer is commonly called "hydrolyzable copolymers." The siloxane block or moiety of such copolymers can consist solely of monohydrocarbonsiloxane units (RSiO$_{1.5}$) or it can consist solely of dihydrocarbonsiloxane units (R$_2$SiO) or it can consist of mixtures of such siloxane units and, if desired, trihydrocarbonsiloxane units (R$_3$SiO$_{0.5}$) as well. Accordingly, one class of these copolymers can be represented by the formula:

$$R'[(R_2SiO)_y]_a[(C_nH_{2n}O)_x]_bR''$$

where $y$ is an integer having a value of at least 2 and denotes the number of siloxane units, $n$ is an integer denoting the number of carbon atoms in the oxyalkylene group, $x$ is an integer and denotes the length of the oxyalkylene chain, and $a$ and $b$ are integers whose sum is 2 or 3. Another class of these copolymers can be represented by the formula:

$$[(R')(SiO_3)_x]_u(R_2SiO)_y[(C_nH_{2n}O)_zR'']_a[R''']_{3z-a}$$

where $x$ is an integer and represents the number of trifunctional silicon atoms bonded to a single monovalent or multivalent hydrocarbon radical, R'; $a$ is an integer and represents the number of polyoxyalkylene chains in the block copolymer; $y$ is an integer; $u$ has a value of at least 1, and denotes the number of difunctional siloxane units, $n$ is an integer denoting the number of carbon atoms in the oxyalkylene group; and $z$ is an integer and denotes the length of the oxyalkylene chain.

Various of the above-described classes of siloxane-oxyalkylene copolymers are described in U.S. Patents Nos. 3,057,901, 2,846,458, 2,834,748, 2,917,480 and 2,868,824, in Belgian Patent No. 603,552 and in U.S. patent application 61,356 filed Oct. 10, 1960 now Patent No. 3,168,543.

Any monomeric olefinic compound having at least one C=C linkage and any polymerized olefin having substantial residual unsaturation (such as polymers of butadiene, chloroprene and isoprene) is operative in producing the copolymers of this invention. Thus, specific compounds which can be employed herein are hydrocarbon olefins, such as ethylene, butadiene, cyclohexene, styrene, vinyl toluene, divinyl benzene, isoprene and hexadecene, halogenated olefins, such as tetrafluoroethylene, vinyl chloride, allyl chloride, trifluorochloro-ethylene, hexafluorobutadiene, vinylidene chloride, dichloro-ethylene and chlorocyclohexene, untaturated aldehydes, such as crotonaldehyde, acrylic aldehyde and cinnamic aldehyde, unsaturated alcohols, such as allyl alcohol, cyclohexenol, 4-methylpenten-3-ol-1, cinnamic alcohol and penten-4-ol-2, unsaturated acids, such as acrylic acid, methacrylic acid, crotonic acid, vinyl acetic acid, cinnamic acid, maleic acid and its anhydride, dimethylmaleic acid, lauroleic acid, oleic acid, linoleic acid and linlenic acid, unsaturated ethers, such as diallyl ether, allylethyl ether, unsaturated esters, such as methyl acrylate, methyl methacrylate, vinyl acetate and allyl acetate, unsaturated amides such as crotonamide, acrylamide and cinnamamide, unsaturated nitriles such as acrylonitrile, methacrylonitrile and cinnamonitrile, unsaturated mercaptans, such as allyl mercaptan, unsaturated amines, such as allyl amine, allyl ethyl amine and vinyl dimethylamine, unsaturated sulphides, such as allyl sulphide and vinyl sulphide, unsaturated ketones, such as methyl vinyl ketone, allyl acetone and benzalacetophenone, unsaturated isocyanates, such as allyl isocyanate, cinnamyl isocyanate and compounds containing combinations of the above type functional groups. Preferred olefins include styrene, ethylene, vinyl chloride and the alkyl acrylates.

Not only are the above monomeric olefins operative in producing the graft copolymers of the present invention, but also polymeric olefins having substantial C=C residual unsaturation. Thus, polybutadiene, natural gum rubber, polychloroprene, copolymers of butadiene and styrene, copolymers of butadiene and acrylonitrile, polyhexafluorobutadiene and similar compounds can be employed in this invention.

Also included among the olefins that can be employed in producing the graft copolymers of this invention are olefinic silicones. The olefinic silicone compounds employed in producing the graft copolymers of this invention contain at least one olefinically unsaturated substituent attached to silicon and are substantially free of SiH bonds. As used herein, the term "silicone" is employed in a generic sense to denote both organosilicon monomers (silanes) and organosilicon polymers (siloxanes).

Among the olefinic silicone compounds used in producing the graft copolymers of this invention are silanes having the formula:

wherein R is an olefinically unsaturated monovalent hydrocarbon group, R' is a monovalent hydrocarbon group free of aliphatic (olefinic or acetylenic) unsaturation, $a$ has a value from 1 to 3 inclusive, $b$ has a value from 0 to 2 inclusive, $(a+b)$ has a value from 1 to 3 inclusive and X is an OH group or a hydrolyzable group that is non-reactive under the conditions employed in producing the graft copolymer (e.g. the methoxy, acetoxy, propionyloxy, phenoxy, tertiary-butoxy, or fluorine atoms). Illustrative of such silanes are: CH$_2$=CHSiF$_3$, CH$_2$=CHSi(CH$_3$)(OCH$_3$)$_2$, CH$_2$=CHSi(OOCCH$_3$)$_3$ CH$_2$=CHCH$_2$Si(C$_6$H$_5$)$_2$OC(CH$_3$)$_3$, etc. Illustrative of the groups represented by R in Formula 8 are the alkenyl groups (e.g. the vinyl, alkyl, methallyl and butenyl groups), the cycloalkenyl groups (e.g. the cyclopentenyl and the cyclohexenyl groups) and the alkenylaryl groups (e.g. the vinyl phenyl group, CH$_2$=CHC$_6$H$_5$—). Illustrative of the groups represented by R' in Formula 8 are the alkyl groups (e.g. the methyl, ethyl, propyl and butyl groups), the aryl groups (e.g. the phenyl and naphthyl groups), the aralkyl groups (e.g. the beta-phenylethyl groups) and the cycloalkyl groups (e.g. the cyclopentyl and cyclohexyl groups).

Additional olefinic silicone compounds useful in producing the graft copolymers of this invention are siloxanes consisting essentially of groups having the formula:

where R, R', $a$, $b$, $(a+b)$ have the meanings defined for Formula 8. Useful olefinic silicone compounds of the siloxane variety also include siloxanes consisting essentially of from 2 to 98 mole-percent (preferably from 10 to 40 mole-percent) of groups represented by Formula I and from 2 to 98 mole-percent (preferably from 60 to 90 mole-percent) of groups having the formula:

$$R'_cSiO_{\frac{4-c}{2}} \quad (10)$$

wherein R' has the meaning defined in Formula 8 and $c$ has a value from 1 to 3 inclusive. The above-described olefinic siloxanes that are useful in this invention can contain unhydrolyzed groups represented by X in Formula 8 [e.g. acetoxy groups] as end-blocking groups.

It has been found that whereas any of the above olefinic compounds are operative in this invention, the best yields are obtained with those which are free from active hydrogen, that is, hydrogen which is attached directly to oxygen, nitrogen or sulphur atoms.

The graft copolymers of this invention can contain any relative amount of olefin grafted to the silicone-ether compound. Preferably, the copolymers contain from 10 to 10,000 parts by weight of an olefin grafted to 100 parts by weight of a silicone-ether. In some cases, it is more preferable to have from 100 to 5,000 parts by weight of the olefin grafted to 10 parts by weight of the silicone-ether.

A free radical generator is essential as a catalyst in preparing the graft copolymers of this invention. The free radical generators which are operative in this invention include ionizing radiation, organic peroxides and azo compounds.

Illustrative of the organic peroxides which can be employed in producing the graft copolymers of this invention are hydroperoxides such as t-butyl hydroperoxide, cumene hydroperoxide, tetralin hydroperoxide, and triphenylmethylhydroperoxide, peroxy acids such as peroxy acetic acid, peroxybenzoic acid, monoperoxyphthalic acid, diperoxyphthalic acid and 2,4-dichloroperoxybenzoic acid, diorganoperoxides such as di-tertiary butyl peroxide, ascaridol, benzoyl peroxide, 2,4-dichlorobenzoyl peroxide, t-butyl perbenzoate, diacetyl peroxide, dicumyl peroxide, di-t-butyldiperoxyphthalate, $(Me_3COO)_2CMe_2$, and the like.

The azo compounds which are operative in producing the graft copolymers of this invention are those containing tertiary carbon atoms attached to each nitrogen atom of the azo linkage. Illustrative of the compounds which can be employed are:

$Me_2(NC)CN=NC(CN)Me_2$
$Me_3CN=NCMe_3$
$Et_2(NC)CN=NC(CN)Et_2$
$AmMe(NC)CN=NC(CN)MeAm$
$(EtOOC)Me_2CN=NCMe_2(COOEt)$

Me, Et and Am represent methyl, ethyl and amyl radicals in the above formulas. Diorganic peroxides, as for example, di-tertiary butyl peroxide, are preferred catalysts for the grafting reaction. The amount of free radical catalyst employed is not critical although catalyst concentrations from .1%–19% by weight based on the weights of siloxane and oxyalkylene polymers in the reaction mixture can be used advantageously. The amount of catalyst generally preferred ranges from 1.0–5% by weight.

Although it is preferred to use as the ionizing radiation beta particles from an electromechanical source in producing the graft copolymers of this invention, other sources of radiation can be used, such as ultra violet light, gamma rays, X-rays, protons (hydrogen ions), deuterons (heavy hydrogen ions) or positive ions such as alpha particles. Beta radiation (high speed electrons) obtained from radioactive isotopes such as strontium 90-yttrium 90-equilibrium mixture can be used with similar results. Gamma rays, that is, electromagnetic radiation similar to light but covering the wavelength range of 0.1 angstrom unit (A.U.) to 0.001 A.U. may be obtained, for example, from Cobalt 60 isotope or from a 2-million electron volt (m.v.) Van de Graaff electron accelerator equipped with a gold or tungsten target. Alpha particles can be obtained most easily from radio isotopes such as Polonium 210.

X-rays, electromagnetic radiation similar to light but covering the wavelength range of 10 angstrom units (A.U.) to 0.1 A.U. (1 A.U.=$10^{-8}$ cm.), can be obtained from an X-ray machine of, for example, one-half million volts, converted to use for the purpose of this invention. It will be apparent that the term "ionizing radiation" is used herein to embrace gamma and X-rays as well. These latter rays, while they do not carry an electric charge do in their passage through matter, eject electrons and the latter, being electrically charged, are able to produce ionization. Dosages of at least 1 megarep, and preferably from 2 to 6 megareps are suitably employed.

In producing the graft copolymers of this invention, the temperature at which the reaction is carried out will depend on the free radical inducing chemical compound employed and should be high enough to cause formation of free radicals in the reaction mixture. Suitable temperatures range from 30–225° C. with 80–175° C. being the preferred range. Sometimes the reactants are not miscible and difficulties arise in reacting these materials unless a suitable solvent is used, such as, for example, toluene or xylene. The reaction temperature is, therefore, limited by the reflux temperature of the solution and a higher boiling solvent will permit a higher temperature. The type of solvent is critical only insofar as the starting materials must be mutually soluble therein and the solvent must be relatively inert to free radical attack. It is also necessary that the amount of solvent be sufficient to provide a homogeneous solution of the starting materials at the reaction temperature. While the reaction can be carried out at subatmospheric or superatmospheric pressure, there is usually no advantage to doing so.

Blends composed of relatively small amounts of a graft copolymer of this invention mixed with a relatively large amount of thermoplastic organic polymer have very desirable properties which enhance the usefulness of the thermoplastic organic polymers in usual areas of application. Such improved properties include improved release (where the blend is used to produce a molded product), better leveling (where the blend is employed in coating compositions), better filler dispersion, improved adhesion (where the blend is used in laminate), improved slip (where the blend is used in producing phonograph records), improved anti-block (where the blend is used in sheets), and improved rheological properties and the like. Such blends can be produced by simply mixing the desired amount of terpolymer and the thermoplastic organic polymer. The blend preferably contains from 0.01 to 10 parts by weight of the terpolymer per 100 parts by weight of the thermoplastic organic polymer and even more desirably contains from 0.1 to 5 parts by weight of the terpolymer per 100 parts by weight of the thermoplastic organic polymer. Such blends can contain, as additional components, any of the fillers, stabilizers, plasticizers, diluents, dyes, catalysts and other ingredients normally added to the organic polymer to modify the polymer for use in any of the applications in which the organic polymer is conventionally employed.

Illustrative of the organic polymers which can be used in the blends of this invention are those represented generally by the following formula:

$$A-[W-Y]_n-B \quad (10)$$

wherein W and Y represent the same or different repeating units of the organic polymer, A and B are the end groups of the polymer and $n$ is an integer having values of 2 or greater. W and Y represent repeating units of organic polymers which are thermoplastic, that is, polymers which can be softened with heat and while soft can be molded, cast or extended under pressure. These polymers when cooled below their softening point become rigid and retain the shape of the mold. However, on re-heating, these materials again become soft and can be re-molded. Illustrative of the repeating units W and Y which can make up the organic polymers which have been found useful as starting materials in the process of this invention for producing blends are:

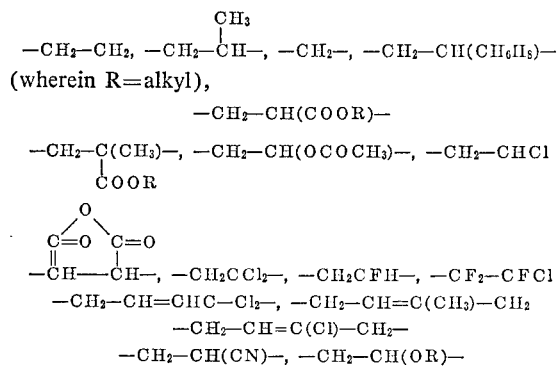

(wherein R=alkyl), and the like.

It is of course understood that organic polymers which are useful in the blends of this invention include not only those polymers where W and Y are two or more different units, but also those where Y and Y are the same (i.e. homopolymers).

These organic polymers are commonly prepared by well known free radical polymerization or copolymerization processes. Commonly, in processes of this type, the end groups represent free radical inhibitor fragments or groups picked up by chain transfer processes.

Illustrative of the second large class of repeating units W and Y in Formula 10 which can make up the organic polymers which have been found useful in the blends of this invention, are those which make up thermoplastics such as nylon, polyurethanes, polyesters such as Dacron and Orlon, epoxy resins, polyacetals such as Delrin, polysulfides such as Thiokol, polycarbonates, phenoxy resins and the like. These organic polymers are commonly prepared by ionic processes which may or may not involve the elimination of volatile by-products. These processes are well known. In these polymers the end groups may be either or both of the co-reactants used to make up the polymer.

Preferably, the organic polymer present in the above-described blends is a polyoxyalkylene compound, polystyrene, polyethylene, a poly(alkyl acrylate) or polyvinyl chloride.

The graft copolymers of this invention are useful as rubber lubricants, particularly for tire molds, lubricants for metal-to-metal moving surfaces and textile lubricants. In addition, the copolymers of this invention are particularly useful as stabilizers for urethane foams. Foams so stabilized have the same utilities as conventional urethane foams. Accordingly, polyurethane foams can be prepared by mixing together an organic isocyanate and a polyether or polyester containing active hydrogen and thereafter developing the foam reaction between these reactants. The mixture is foamed in the presence of a catalyst and a graft copolymer of this invention as a foam stabilizer by means of a blowing agent such as water, a fluorocarbon or other inert gas or mixtures thereof.

Polyurethane foamed products containing graft copolymers of this invention as foam stabilizers can be produced by known processes. One process is a one-shot technique wherein all of the reactants are reacted simultaneously with the foaming operation. The second type of general process is the prepolymer process. In this latter method, a prepolymer is formed by completing the reaction between the polyether and the isocyanate. The prepolymer can later be foamed by reaction with water or inert blowing agent. Also, the quasi-prepolymer technique can be used to produce foams. In this technique, the isocyanate is first reacted with a portion of the polyether to give a product having a high percentage of free —NCO groups (e.g. from 20 to 50 percent), and this product is subsequently foamed by reaction with polyol and foaming agent. The above-described processes are well known and are generally suitable for use with foam formulations containing graft copolymers of this invention as foam stabilizers.

Thus, the foam formulations of this invention contain (1) a polyether or polyester containing at least two active hydrogen atoms, (2) an organic isocyanate (or mixture of organic isocyanates) containing at least two isocyanate groups, (3) a catalyst (or mixture of catalyst), (4) a blowing agent and (5) a graft copolymer of this invention. The polyethers used in these formulations are also known as "polyols." It is often convenient to provide mixtures of a graft copolymer of the invention and one or more, but not all, of the other components of the above-mentioned foam formulations. Such mixtures can be blended with the remaining components just prior to use in producing a foam. Such mixtures can be stored indefinitely without significant deterioration or reaction occurring due to the hydrolytic stability of the graft copolymers. Suitable mixtures include graft copolymer-polyether mixtures, graft copolymer-catalyst mixtures and graft copolymer-polyether-catalyst mixtures.

The active hydrogen-containing polyethers in the foam formulations of this invention include the linear and branched chain polyethers which have a plurality of acyclic ether oxygens and contain at least two hydroxyl radicals. Such hydroxyl groups are preferably alcoholic hydroxyl groups (as distinguished, for example, from the hydroxyl groups in carboxy groups, —OOOH) and are most preferably attached to aliphatic carbon atoms (i.e. carbon atoms not in an aromatic ring). The polyethers have molecular weights, based on their hydroxyl values, ranging from 50 to 7500. Illustrative polyethers include the polyoxyalkylene polyols containing one or more chains of connected oxyalkylene radicals which are prepared by the reaction of one or more alkylene oxides with acyclic and alicyclic polyols. Examples of the polyoxyalkylene polyols include the polyoxyethylene glycols prepared by the addition of ethylene oxide to water, ethylene glycol or dipropylene glycol, polyoxypropylene glycols prepared by the addition of propylene oxide to water, propylene glycol or dipropylene glycol, mixed oxyethylene-oxypropylene polyglycols prepared in a similar manner utilizing a mixture of ethylene oxide and propylene oxide or a sequential addition of ethylene oxide and propylene oxide, and the polyoxybutylene glycols and copolymers such as polyoxyethylene oxybutylene glycols and polyoxypropyleneoxybutylene glycols. Included in the term "polyoxybutylene glycols" are polymers of 1,2-butylene oxide, 2,3-butylene oxide and 1,4-butylene oxide.

Other acyclic and alicyclic polyols which can be reacted with ethylene oxide, propylene oxide, butylene oxide or mixtures thereof to provide polyethers that are useful in the foam formulation of this invention include glycerol, trimethylolpropane, 1,2,6-hexanetriol, pentaerythritol, sorbitol and glycosides. Further polyethers that are useful in the foam formulation of this invention are prepared by reacting a 1,2-alkylene oxide such as ethylene oxide, propylene oxide, butylene oxide or mixtures thereof with mononuclear polyhydroxybenzenes such as resorcinol, pyrogallol, phloroflucinol and hydroquinone.

Other polyethers which can be employed in the foam formulations of this invention are those obtained by reacting 1,2-alkylene oxides or mixtures thereof with polynuclear hydroxybenzenes such as the various di, tri and tetraphenylol compounds in which two to four hydroxybenzene groups are attached by means of single bonds or by an aliphatic hydrocarbon radical containing one to twelve carbon atoms. Tetraphenylol compounds which can be reacted with 1,2-alkylene oxides to produce polyethers that are useful in the foam formulations of this invention include the alpha, alpha, omega, omega-tetrakis (hydroxyphenyl)alkanes such as 1,1,2,2 - tetrakis(hydroxyphenyl)ethanes. Other polyethers which can be employed in the foam formulations of this invention are the ethylene oxide, propylene oxide and butylene oxide adducts of phenol-formaldehyde condensation product materials such as the novolaks. Polyethers suitable for use in the foam formulations of this invention are prepared by reacting one or more of the alkylene oxides above noted with acyclic polyamines such as ethylenediamine, propylenediamine, etc.

Other suitable polyethers useful in the foam formulations of this invention include the 1,2-alkylene oxide derivatives of mononuclear primary amines such as o-, m- and p-phenylenediamine. Higher functional mono- and polynuclear polyamines which also can be reacted with 1,2-alkylene oxides to provide polyethers suitable for use in the foam formulations of this invention include 2,4,6-triaminotoluene and 2,3,5-triaminotoluene.

The molecular weight of the polyethers used should range from 250 to 7500 depending upon the characteristics desired in the foamed urethane product. As a general rule for flexible open-cell urethane foams the polyether should have a molecular weight of from about 1800 to 5000. Lower molecular weight values give rise to rigid and semi-rigid foams.

In addition to the hydroxyl-containing polyethers described above, many other classes of compounds containing active hydrogen atoms can react with organic isocyanates to produce urethane resin foams. Examples of other operable active hydrogen-containing compounds are hydroxy-containing polyesters, polyamides and polyamines. The graft copolymers of this invention are also foam stabilizers for urethane foam formulations containing such polyesters, polyamides and polyamines.

The polyesters referred to are prepared by a condensation reaction between a stoichiometric excess of one or a mixture of two or more of the above-described polyols and one or a mixture of two or more dibasic carboxylic acids such as adipic, succinic, azelaic, glycolic, glutaric or sebacic acid. The stoichiometric excess of polyol is employed to insure the presence of at least an average of two hydroxyl groups per polyester molecule. For example, when 1.0 mole of adipic acid is condensed with 1.35 moles of a mixture containing approximately equal molecular amounts of ethylene glycol, diethylene glycol, and butylene glycol, the resulting polyester has a hydroxyl number of 60, an acid number of 2 and a corresponding average molecular weight of about 1800.

A variety of organic isocyanates can be employed in the foam formulations of this invention for reaction with the polyethers above described to provide urethane foams. Preferred isocyanates are polyisocyanates and polyisothiocyanates of the general formula:

$$Q(NCY)_i$$

wherein Y is oxygen or sulfur, $i$ is an integer of two or more and Q is an alkylene, substituted alkylene, arylene or substituted arylene radical, a hydrocarbon or substituted hydrocarbon radical containing one or more aryl —NCY bonds and one or more alkyl —NCY bonds. Q can also include radicals such as —QZQ— where Z can be a divalent moiety such as —O—, —O—Q—O—, —CO—, —CO$_2$—, —S—, —S—Q—S— and —SO$_2$—. Examples of such compounds include hexamethylene diisocyanate, 1,8 - diisocyanato-p-menthane, xylylene diisocyanate, (OCNCH$_2$CH$_2$CH$_2$OCH$_2$)$_2$, 1-methyl-2,4-diisocyanatocyclohexane, phenylene diisocyanates, tolylene diisocyanates, chlorophenylene diisocyanates, diphenylmethane-4,4′-diisocyanate, naphthalene-1,5-diisocyanate, triphenylmethane-4,4′4″-triisocyanate, xylene-alpha, alpha′-diisothiocyanate and isopropylbenzene-alpha - 4 - diisocyanate.

Further included among the isocyanates useful in the foam formulations of this invention are dimers and trimers of isocyanates and diisocyanates and polymeric diisocyanates of the general formula:

$$Q(NCY)_i \text{ and } [Q(NCY)_i]_j$$

in which $i$ and $j$ are integers of two or more as well as compounds of the general formula:

$$L(NCY)_i$$

in which $i$ is one or more and L is a monofunctional or polyfunctional atom or radical. Examples of this type include ethylphosphonic diisocyanate, C$_2$H$_5$P(O)(NCO)$_2$, phenylphosphonic diisocyanate, C$_6$H$_5$P(O)(NCO)$_2$, compounds containing a —Si—NCY group, isocyanates derived from sulfonamides (QSO$_2$NCO), cyanic acid, thiocyanic acid and compounds containing a metal —NCY radical such as tributyltin isocyanate.

The amount of isocyanate employed in the foam formulation of this invention will depend upon the density of the urethane foam and the amount of crosslinking desired. In general, the total —NCO equivalent to total active hydrogen equivalent of the polyether should be such as to provide a ratio of 0.8 to 1.2 equivalents of —NCO per equivalent of active hydrogen, and preferably, a ratio of 1.0 to 1.1 equivalents.

The foaming of the foam formulations of this invention is effected by methylene chloride, by water, by liquefied fluorocarbon gases which have boiling points below 80° F. and above —60° F., or by other inert gases such as nitrogen, carbon dioxide, methane, helium and argon. The liquefied gases are saturated aliphatic fluorohydrocarbons which vaporize at or below the temperature of the foaming mass. Such gases are at least partially fluorinated and can also be otherwise halogenated.

Fluorocarbon blowing agents suitable for use in foaming the formulations of this invention include trichloromonofluoromethane, dichlorodifluoromethane, dichlorofluoromethane, 1,1-dichloro-1-fluoroethane, 1-chloro-1,1-difluoro, 2,2-dichloroethane and 1,1,1-trifluoro, 2-chloro-2-fluoro, 3,3-difluoro-4,4,4-trifluorobutane. The amount of blowing agent used will vary with density desired in the foaming product. In general, it may be stated that for 100 grams of resin mix containing an average NCO/OH ratio of 1 to 1, 0.005 to 0.3 mole of gas is used to provide densities ranging from 30 to 1 pounds per cubic foot. If desired, water can be used in conjunction with the inert gas or fluorocarbon blowing agent, or water can be used as the only blowing agent.

Catalysts that are suitable for accelerating the polyether-isocyanate reaction in the foam formulations of this invention include amines and a wide variety of metal compounds, both inorganic metal compounds and metal compounds which contain organic groups. Particularly useful catalysts are tertiary amines and organo-tin compounds. All of the above catalysts can be used alone or in mixtures with one or more of the other such catalysts.

Among the organo-tin compounds suitable for use in the foam formulations of this invention that deserve particular mention are stannous acylates such as stannous acetate, stannous octoate, stannous laurate and stannous oleate, stannous alkoxides such as stannous butoxide, stannous 2-ethylhexoxide and stannous phenoxide, o-, m- and p-stannous cresoxides, dialkyl tin salts of carboxylic acids, e.g. dibutyltin diacetate, dibutyltin dilaurate, dibutyltin maleate, dilauryltin diacetate and dioctyltin diacetate. Similarly, there can be used a trialkyltin hydroxide, dialkyltin oxide or dialkyltin chloride. Examples of these compounds include trimethyltin hydroxide, tributyltin hydroxide, trioctyltin hydroxide, dibutyltin oxide, dioctyltin oxide, dilauryltin oxide, dibutyltin dichloride and dioctyltin dichloride.

The tertiary amines which are useful as catalysts in the formulations of this invention include tertiary amines substantially unreactive with isocyanate groups and tertiary amines containing active hydrogen atoms reactive with isocyanate groups. Typical tertiary amines which are substantially unreactive with isocyanate groups include triethylamine, tributylamine, trioctylamine, N-methylmorpholine, N-ethylmorpholine, N-octadecylmorpholine (N-Cocomorpholine), N,N,N′,N′ - tetramethylethylenediamine, N,N,N',N' - tetramethyl-1,3-propanediamine, and triethylenediamine.

Typical tertiary amines containing active hydrogen atoms reactive with isocyanate groups suitable for use in the foam formulations of this invention include dimethylethanolamine, triethanolamine, triisopropanolamine, N - methyldiethanolamine, N-ethyldiethanolamine, polyoxyalkylene polyol polymers and copolymers of alkylene oxides, such as propylene oxide, ethylene oxide, homopolymers, copolymers and mixtures thereof started with triethanolamine, triisopropanolamine, ethylenediamine, ethanolamine and diethylenetriamine. Still other tertiary amines containing active hydrogen atoms reactive with isocyanate groups include polyesters based on polyols such as illustrated above including triethanolamine, triisopropanolamine, and N-alkyl diethanolamines, as well as polycarboxylic acids containing tertiary nitrogen atoms.

Other catalysts suitable for use in the foam formulations of this invention include metal organic compounds of lead, arsenic, antimony and bismuth compounds characterized by the presence therein of a direct carbon-to-metal bond, organic halides of titanium, the inorganic halides of tetravalent tin, arsenic, antimony, bimuth and titanium, polystannates, tin, titanium and copper chelates and mercury salts.

Still other catalysts suitable for use in the foam formulations of this invention include tertiary phosphines (such as trialkyphosphines and dialkylbenzylphosphines), strong bases (such as the alkali and alkaline earth metal hydroxides, alkoxides and phenoxides), chelates of various metals (such as those which can be obtained from acetylacetone, benzoylacetone, trifluoroacetylacetone, ethyl acetoacetate, salicylaldehyde, cyclopentanone-2-carboxylate, acetylacetoneimine, bis-acetylacetonealkylenediimines, salicylaldehydeimine and the like, with various metals such as Be, Mg, Zn, Cd, etc.

In addition to the above-described polyethers, graft copolymers, polyisocyanates, catalysts and blowing agents, the polyurethane foam compositions of this invention may contain, if desired, other components such as:

(a) diol forming modifiers, such as ethylene glycol, polyethylene glycol and the like;
(b) crosslinking agents, such as pentaerythritol, glycerol, N,N,N',N-tetrakis(2-hydroxypropyl)ethylene diamine, and the like;
(c) flame retardants, generally alkyl phosphates or inorganic compounds, such as antimony oxide and the like;
(d) thermal stabilizers, such as d-tartaric acid, t-butyl catechol and the like;
(e) plasticizers, such as di-octyl phthalate and the like;
(f) fillers, such as scrap shredded foam, wood flour, metal flakes and the like;
(g) pigments, such as titania, silica, carbon black and the like;
(h) dyes, antioxidants, antiosonants, deodorants, fungicides, and the like.

The amounts of the various components employed in the foam formulations of this invention are not narrowly critical.

When water is present as a foaming agent, amounts of water from 0.5 to 5 weight percent based on the total weight of the formulations can be advantageously employed.

The amount of catalyst to be employed in the urethane foam formulations of this invention is well understood by persons skilled in the urethane resin foam art. In general, the total amount of catalyst or mixture of catalysts is from 0.001 percent to 5 percent of the foam formulation. The amount of graft copolymer of this invention employed as a foam stabilizer in the foam formulations (reaction mixtures) of this invention used in producing urethane foams vary over wide limits from about 0.1 weight percent to about 10 weight percent or greater.

Weight percentages are based on the total weight of the foam formulations, that is, the polyether, isocyanate, catalyst, blowing agent and foam stabilizer.

The following examples illustrate the present invention.

In the following examples, "Me" is used to denote the methyl group and all percentages are by weight unless indicated otherwise.

EXAMPLE I

To a 1000-milliliter, 3-neck round bottom flask, fitted with an agitator dropping funnel, reflux condenser, thermometer, mantle and an inert gas guard, flushed with nitrogen was charged 50 grams of a siloxane having the average formula

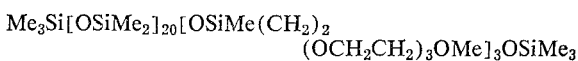

and 250 grams of diphenyl ether. The contents were heated to 160° C. and 459 grams of redistilled styrene containing 5.8 grams of ditertiary butyl peroxide was added dropwise over a one-hour period. The product was slightly hazy after removal of volatile materials by heating to 250° C. while the pressure was lowered to 300 microns of mercury. According to the weight of material recovered, 97% of the styrene had polymerized. The silicon content of the devolatilized (stripped) material was 2.75%. A 20 gram sample of the crude, stripped material was dissolved in 100 grams of benzene. The benzene solution was added dropwise to 2,000 grams of methanol and the methanol insoluble material which separated out as a white solid (graft copolymer) was isolated by filtration and devolatilized as above. The graft copolymer so purified was clear and hazeless and contained 2.2% silicon. This purified copolymer had a viscosity in toluene (10 parts by weight in 90 parts by weight of toluene) of 1.68 cs. (centistokes) indicating a low molecular weight material. The siloxane and styrene starting materials are soluble in the methanol while the graft copolymer is not. A purification is thus effected by such procedures. The presence of the silicon in the purified product, its haze free appearance and an infrared scan of the material all indicate that the desired graft copolymer was made.

EXAMPLE II

This experiment was identical to Example I with the exception that 33.3 grams of ditertiary butyl peroxide was mixed with the styrene. After removal of volatiles, the graft copolymer was haze free and the weight balance indicated 100% styrene polymerized. This product contained 2.7% silicon. After purification by adding a benzene solution of the product to methanol, the silicon content of the product (precipitate from methanol) was 2.6% and a toluene solution thereof had a viscosity of 4.32 cs. (10 parts by weight of sample in 90 parts by weight of toluene).

EXAMPLE III

This experiment was similar to Example I. Two hundred grams of the siloxane used in Example I, 400 grams of diphenyl ether and 100 grams of xylene were put in the reaction flask. The contents of the flask were heated to 160° C. and a mixture of 300 grams of styrene and 37.5 grams of ditertiary butyl peroxide was added to the flask dropwise over a one-hour period. The product (graft copolymer) was substantially haze free and contained 10.8% silicon.

EXAMPLE IV

To a 500 mol. 3-neck flask fittted as described in Example I was charged 40 grams of the compound

and 6 grams of ditertiary butyl peroxide. The flask contents were heated to 150° C. and 60 grams of redistilled inhibitor-free styrene were added dropwise to the flask over a one-hour period. The product was desolvated by heating to 260° C. while lowering the pressure to 800 microns of mercury. 78 grams of a solid graft copolymer were recovered. The copolymer was substantially free of haze and contained 3.8% silicon. A 20-gram sample of the copolymer was dissolved in 100 grams of benzene and the benzene solution added dropwise to 2,000 grams of methanol. Purified graft copolymer precipitated. After desolvation as above, the purified copolymer analyzed 2.8% silicon. It was precipitated in like fashion twice more. The further purified copolymer now contained 2.3% silicon. The infrared scan indicated that the desired copolymer was made.

EXAMPLE V

In identical fashion as outlined in Example III, styrene was grafted to a siloxane having the formula:

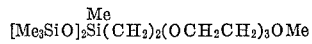

120 grams of styrene were grafted to 80 grams of the siloxane using 12 grams of ditertiary butyl peroxide as the initiator. After stripping, 159.9 grams of a clear solid was recovered (79.7% recovery), which contained 5.1% silicon. 20 grams of the stripepd (desolvated) crude product was dissolved in 100 grams of benzene, the benzene solution added to 2,000 grams of methanol and the graft copolymer precipitated. The copolymer was found to contain 2.4% silicon and, after two more precipitations, it was found to contain 2.4% silicon. The persistance of the same silicon content after precipitation in methanol (in which the starting materials are soluble) and the infrared absorption both indicated that the desired graft copolymer was obtained.

EXAMPLE VI

To a 2000 ml., 3-neck flask fitted as described in Example I, was charged 250 grams of diphenylether, 50 grams of xylene and 125 grams of $$Me_3Si[OSiMe_2]_{20}[OSiMe(CH_2)_2(OCH_2CH_2)_2OME]_3OSiMe_3$$

A mixture of 376 grams of styrene and 28 grams of ditertiary butyl peroxide were added dropwise to the flask heated to 160° C. over a two-hour period. The theoretical yield of a clear solid graft copolymer was realized (500 grams) after solvent stripping (i.e. solvent removal at reduced pressure). A 10 weight percent solution of the graft copolymer in toluene had a viscosity of 1.79 cs. The copolymer contained 6.9% silicon.

EXAMPLE VII

To a 2000 mol., 3-neck flask fitted as described in Example I was charged 250 grams of diphenyl ether and 125 grams of

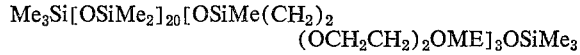

A mixture of 375 grams of styrene and 14.6 grams of ditertiary butyl peroxide was added in dropwise fashion to the flask heated to 160° C. over an 85-minute period. After removal of the solvents, 445 grams of a slightly hazy solid was recovered (89% of theory), which contained 6.6% silicon. A portion of this solid dissolved in benzene was added dropwise to 3,000 grams of isopropanol. The graft copolymer was recovered as a clear solid precipitate which contained 5.3% silicon.

EXAMPLE VIII

To a 500 ml., 3-neck flask fitted as described in Example I, was charged 25 grams of

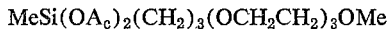

[where $A_c$ represents —$OCCH_3$] and 50 grams of diphenyl ether. A mixture of 75 grams of inhibitor-free styrene and 7.5 grams of ditertiary butyl peroxide were added dropwise to the flask, heated to 160° C., over a 2-hour period. After stripping 51.4 grams of the reaction mixture by heating to 250° C. at 300 millimeters of mercury pressure, 31.1 grams of a solid were recovered. This corresponds to a recovery of 93.5%. This stripped crude product contained 1.2% silicon and 3.7% acetoxy. A portion of the product (graft copolymer) was heated with a mixture of xylene and an oxyalkylene polymer [the latter polymer had the formula $$HO(C_2H_4O)_x(C_3H_6O)_yC_4H_9$$

had a molecular weight of 3,700 and contained 50 weight-percent $C_2H_4O$ units and 50 weight-percent $C_3H_6O$ units based on the total amount of such units] at 115–125° C. in a distillation apparatus. An azeotrope of acetic acid and xylene was removed. The infrared scan of the product showed absorption characteristic of polystyrene, silicone and organic ether. During the reaction, the hydroxyl absorption of the reaction mixture decreased in intensity as did the carbonyl absorption showing that the SiOAc of the graft copolymer was reacting with COH of the oxyalkylene polymer. This "final product" was soluble in methanol and water.

Another portion of the graft copolymer, which had been stripped of solvent but not reacted with the oxyalkylene polymer, was insoluble in methanol and water.

EXAMPLE IX

To demonstrate the ability of the graft copolymers to affect the surface tension of polystyrene, one weight percent of various copolymers was mixed with a polystyrene having a molecular weight of 10,000 and dried films were produced therefrom. The surface tension of dried films was measured by the ability of 1 weight-percent aqueous $C_{12}H_{25}O(C_2H_4O)_6H$ (Tergitol TMN) to spread on these films. A 0.02 milliliter drop of the latter solution was put on the film and the diameter of the drop (in millimeters) measured after three minutes.

| Copolymer of Example | Percent Si in Copolymers | Spreading of Droplets on Styrene Modified With 1 wt., percent of Graft Copolymer — Tergitol TMN Solution, mm. |
|---|---|---|
| III | 10.8 | 0.75 |
| VI | 6.9 | 0.73 |
| VII | 5.3 | 0.80 |
| I | 2.2 | 0.76 |
| II | 2.7 | 0.84 |
| Unmodified styrene (control) | | 1.18 |
| Do | | 1.10 |
| Do | | 1.18 |
| Do | | 1.20 |

The unmodified polystyrene dried with an orange peel effect, while in each case the modified styrene levelled as it dried, indicating improved levelling.

As used herein, the terms "olefin" and "olefinic compound" denote a compound containing an aliphatic carbon-to-carbon double bond (i.e. a bond such as is present in styrene and vinyl chloride). Such compounds have at least one olefinic C=C linkage. Such compounds can, of course, contain any of a wide variety of constituents in addition to the olefinic double bond. Thus, they can contain aryl groups, silyl groups, organic ester groups, etc. as indicated by the numerous illustrative olefins set forth hereinabove.

What is claimed is:
1. A silicone-ether-olefin graft copolymer produced by grafting (1) an organic compound containing at least one olefinic C=C linkage selected from the group consisting of (a) hydrocarbon olefins; (b) halogenated olefins; (c) olefinically unsaturated aldehydes, alcohols, acids, ethers, esters, amides, nitriles, mercaptans, amines, sulphides, ketones and isocyanates; (d) polybutadiene, natural gum rubber, polychloroprene, copolymers of butadiene and styrene, copolymers of butadiene and acrylonitrile and polyhexafluorobutadiene having substantial residual olefinic unsaturation; and (e) maleic anhydride to (2) a silicone-ether compound selected from the group consisting of:

(A) silanes having the formula:

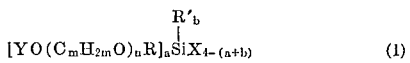

wherein Y is a member selected from the group consisting of the hydroxyalkyl groups, acyloxyalkyl groups, R' and —RSi(R'$_b$)X$_{4-(a+b)}$ groups, R is a divalent organic group, R' is a monovalent hydrocarbon group free of aliphatic unsaturation, X is a member selected from the group consisting of the hydroalkyl groups, acyloxyalkyl groups, OH, OCH$_3$, OC$_6$H$_5$, acyloxy fluorine and (CH$_3$)$_3$CO— groups, $a$ has a value from 1 to 3 inclusive, $b$ has a value from 0 to 2 inclusive, $(a+b)$ has a value from 1 to 3 inclusive, $m$ has a value of at least 2 and $n$ has a value of at least 0;

(B) siloxanes consisting essentially of groups having the formula:

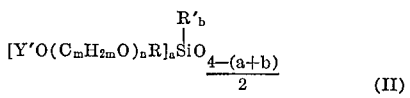

wherein Y' is a member selected from the group consisting of the hydroxyalkyl groups, acyloxyalkyl groups, R' and

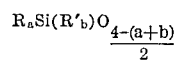

groups and R, R', $a$, $b$, $(a+b)$, $m$ and $n$ have the above-defined meanings; and (C) siloxanes consisting essentially of from 2 to 98 mole-percent of groups represented by Formula II and from 2 to 98 mole-percent of groups having the formula:

wherein R' has the above-defined meaning and $c$ has a value from 1 to 3 inclusive, said grafting occurring in a homogeneous solution containing (1) and (2) and in the presence of a free radical generator which is ionizing radiation, an organic peroxide or an azo compound.

2. The graft copolymer of claim 1 wherein R is a member selected from the group consisting of the divalent hydrocarbon group and the —R"—O— where R" is a divalent hydrocarbon group and the oxygen atom is bonded to silicon; wherein $n$ has a value of at least 2; and wherein the graft copolymer contains 10 to 1,000 parts by weight of the organic compound containing at least one olefinic C=C linkage grafted to 100 parts by weight of the silicone-ether compound.

3. A copolymer as described in claim 1 wherein R is a member selected from the group consisting of the divalent hydrocarbon group and the —R"—O— group where R" is a divalent hydrocarbon group and the oxygen atom is bonded to silicon, wherein $n$ has a value of at least 2, wherein the graft copolymer contains from 10 to 1,000 parts by weight of the organic compound containing at least one olefinic C=C linkage grafted to 100 parts by weight of the silicone-ether compound, wherein the organic compound containing at least one olefinic C=C linkage is a member selected from the group consisting of styrene, ethylene vinyl chloride and the alkyl acrylates and wherein the silicone-ether compound is a silane as described in part A of claim 1.

4. A copolymer as described in claim 1 wherein R is a member selected from the group consisting of the divalent hydrocarbon group and the —R"—O— group where R" is a divalent hydrocarbon group and the oxygen atom is bonded to silicon, wherein $n$ has a value of at least 2, wherein the graft copolymer contains from 10 to 1,000 parts by weight of the organic compound containing at least one olefinic C=C linkage grafted to 100 parts by weight of the silicone-ether compound, wherein the organic compound containing at least one olefinic C=C linkage is a member selected from the group consisting of styrene, ethylene vinyl chloride and the alkyl acrylates and wherein the silicone-oxyalkylene copolymer is a siloxane as described in part B of claim 1.

5. A terpolymer as described in claim 1 wherein R is a member selected from the group consisting of the divalent hydrocarbon group and the —R"—O— group where R" is a divalent hydrocarbon group and the oxygen atom is bonded to silicon, wherein $n$ has a value of at least 2, wherein the graft copolymer contains from 10 to 1,000 parts by weight of the organic compound containing at least one olefinic C=C linkage grafted to 100 parts by weight of the silicone-ether compound, wherein the organic compound containing at least one olefinic C=C linkage is a member selected from the group consisting of styrene, ethylene, vinyl chloride and the alkyl acrylates and wherein the silicone-ether compound is a siloxane as described in part C of claim 1.

6. A blend consisting essentially of a minor amount of a graft copolymer as described in claim 1 and a major amount of a thermoplastic organic polymer selected from the group consisting of nylon, polyurethanes, polyesters, epoxy resins, polyacetals, polysulfides, polycarbonates, phenoxy resins, polyoxyalkylene compounds, polystyrene, polyethylene, poly(alkylacrylates), poly(vinyl chloride) and polymers consisting essentially of the same or different repeating units having the formulas:

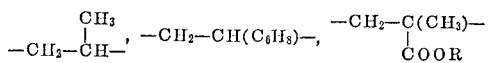

wherein R is alkyl,

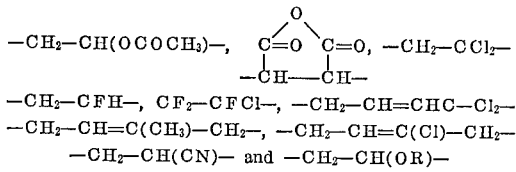

—CH$_2$—CH(CN)— and —CH$_2$—CH(OR)— wherein $r$ is alkyl.

7. A blend consisting essentially of a mixture of a graft copolymer as described in claim 1 and a thermoplastic organic polymer selected from the group consisting of polyoxyalkylene compounds, polystyrene, polyethylene, polyalkylacrylates and polyvinyl chloride, said copolymer being present in an amount from 0.1 to 5 parts by weight per 100 parts of organic polymer.

8. A blend consisting essentially of a mixture of a graft copolymer as described in claim 2 and a thermoplastic organic polymer selected from the group consisting of polyoxyalkylene compounds, polystyrene, polyethylene, polyalkylacrylates and polyvinyl chlorides, said copolymer being present in an amount from 0.1 to 5 parts by weight per 100 parts of organic polymer.

9. A blend consisting essentially of a mixture of a graft copolymer as described in claim 3 and a thermoplastic organic polymer selected from the group consisting of polyoxyalkylene compounds, polystyrene, polyethylene, polyalkylacrylates and polyvinyl chloride, said copolymer being present in an amount from 0.1 to 5 parts by weight per 100 parts of organic polymer.

10. A blend consisting essentially of a mixture of a graft copolymer as described in claim 4 and a thermoplastic organic polymer selected from the group consisting of polyoxyalkylene compounds, polystyrene, polyethylene, polyalkylacrylates and polyvinyl chloride, said copolymer being present in an amount from 0.1 to 5 parts by weight per 100 parts of the organic polymer.

11. A blend consisting essentially of a mixture of a graft copolymer as described in claim 5 and a thermoplastic organic polymer selected from the group consisting of polyoxyalkylene compounds, polystyrene, polyethylene, polyalkylacrylates and polyvinyl chloride, said copolymer being present in an amount from 0.1 to 5 parts by weight per 100 parts of the organic polymer.

12. The terpolymer of claim 5 wherein the olefin in styrene and the silicone-ether compound has the formula:

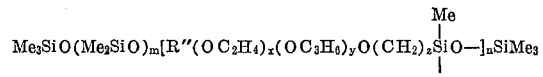

wherein Me is methyl, $m$ has a value from 3 to 25 inclusive, $n$ has a value from 2 to 10 inclusive, $x$ has a value from 3 to 25 inclusive, $y$ has a value from 0 to 25 inclusive, $z$ has a value from 2 to 3 inclusive, and R'' is an alkyl group containing from 1 to 4 carbon atoms inclusive.

13. The terpolymer of claim 5 wherein the silicone-ether compound has the formula:

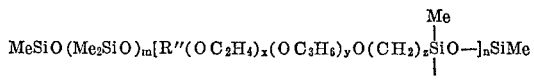

wherein Me is methyl, $m$ has a value from 3 to 25 inclusive, $n$ has a value from 2 to 10 inclusive, $x$ has a value from 3 to 25 inclusive, $y$ has a value from 0 to 25 inclusive, $z$ has a value from 2 to 3 inclusive and R'' is an alkyl group containing from 1 to 4 carbon atoms inclusive.

References Cited

UNITED STATES PATENTS

| | | | |
|---|---|---|---|
| 3,342,766 | 9/1967 | Huntington | 260—827 |
| 3,013,915 | 12/1961 | Morgan | 260—46.5 |
| 3,277,777 | 1/1966 | Safford | 260—827 |
| 3,246,048 | 4/1966 | Haluska | 260—827 |

DONALD E. CZAJA, Primary Examiner

M. I. MARQUIS, Assistant Examiner

U.S. Cl. X.R.

204—159.13; 260—2.5, 18, 37, 46.5, 77.5, 448.2, 448.8